United States Patent
Gunawardena et al.

(10) Patent No.: US 7,649,841 B2
(45) Date of Patent: Jan. 19, 2010

(54) COMPETITIVE AND CONSIDERATE CONGESTION CONTROL

(75) Inventors: Dinan Gunawardena, Cambridge (GB); Shao Liu, Urbana, IL (US); Laurent Massoulie, Cambridge (GB); Milan Vojnovic, Cambridge (GB); Peter B. Key, Cambridge (GB)

(73) Assignee: Microsoft Corporation, Redmond, WA (US)

( * ) Notice: Subject to any disclaimer, the term of this patent is extended or adjusted under 35 U.S.C. 154(b) by 618 days.

(21) Appl. No.: 11/454,203

(22) Filed: Jun. 16, 2006

(65) Prior Publication Data

US 2007/0211633 A1  Sep. 13, 2007

Related U.S. Application Data

(60) Provisional application No. 60/782,051, filed on Mar. 13, 2006.

(51) Int. Cl.
H04L 12/26 (2006.01)
(52) U.S. Cl. ........................ 370/231; 370/232
(58) Field of Classification Search ........................ None
See application file for complete search history.

(56) References Cited

U.S. PATENT DOCUMENTS 6,118,791 A * 9/2000 Fichou et al. ............... 370/468
6,144,636 A * 11/2000 Aimoto et al. ............. 370/229
6,438,106 B1 * 8/2002 Pillar et al. ................. 370/232
7,072,295 B1 * 7/2006 Benson et al. ............. 370/230
7,420,917 B2 * 9/2008 Ishikawa et al. ........... 370/232

FOREIGN PATENT DOCUMENTS

EP  1744496  7/2005

* cited by examiner

*Primary Examiner*—Kevin C Harper
*Assistant Examiner*—Rhonda Murphy
(74) *Attorney, Agent, or Firm*—Woodcock Washburn LLP

(57) ABSTRACT

An end-to-end congestion control is provided that emulates a different service differentiation than the common low-normal priority. This protocol is referred to as 4CP (Competitive, Considerate Congestion Control). The target service differentiation enables provisioning of per-flow average bandwidth guarantees to "normal" traffic, but not at the expense of potentially starving the "low" priority traffic (4CP). It thus features incentive compatibility to file-transfer applications that are throughput-greedy but want to be considerate to other traffic. 4CP is implemented and configured as a sender-only adaptation of standard TCP, and requires no special network feedback. Configuration of the bandwidth guarantee is either statically configured or automatically adjusted by 4CP. The automatic mode aims to be TCP-friendly over appropriately large timescale.

12 Claims, 12 Drawing Sheets

COMPETITIVE AND CONSIDERATE CONGESTION CONTROL

CROSS-REFERENCE TO RELATED APPLICATION

This application claims priority to Provisional Patent Application No. 60/781,051, filed on Mar. 13, 2006 (MSFT-5642).

COPYRIGHT NOTICE AND PERMISSION

A portion of the disclosure of this patent document may contain material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice shall apply to this document: Copyright© 2006, Microsoft Corp.

BACKGROUND

Currently, the Internet provides "best-effort" service that offers no preferential service per application. There have been proposals to upgrade the Internet with service differentiation by two major proposals discussed at the Internet Engineering Task Force (IETF), namely, integrated and differentiated services. There have been proposals for both premium ("better than best effort") service and "lower than best effort." None of these network-centric solutions has achieved a wide scale usage. Service differentiation of "normal priority" and "low priority" traffic is emulated in practice at the end-points by the protocols such as Microsoft's BITS, used widely for download of software updates with the aim to be non intrusive to user' experience. The common goal of these transport control protocols is to emulate the reference system of two priority classes, high and low, implemented at network nodes by strict priority schedulers that would, essentially, serve low priority traffic only in absence of high priority. The fact is that many file-transfer applications are transfers of large files that are human unattended and last for tens of minutes, hours or even days. The designers of the file transfer applications do want their transfers to achieve good throughputs, and may not have incentive to use the transport control protocols that emulate lower than best effort service, as by their very design they may often starve for periods of time in presence of any activity along the network path.

A common consequence is the preference to use standard TCP for bulk data transfers. For a file transfer using a single TCP connection, then the bandwidth-sharing objective is that of TCP fairness. In the case of a single bottleneck within TCP connections that all have some common mean roundtrip time, TCP fairness mandates allocating a fraction 1/n of the link bottleneck to each connection. This presumes this is the only bottleneck for these connections. The problem is that it is now the norm rather than the exception for end users to have several concurrent file transfers (e.g. peer-to-peer file sharing applications or, in general, parallel ftp transfers of large data volumes), resulting in throttling down any other connections to a minuscule TCP fair share of the bottleneck. For concreteness, consider a home user that has several computers at home interconnected with a high-speed LAN and connected to the Internet by a broadband connection. Suppose the user uses a peer-to-peer file sharing application that results in both upload and download file transfers and these may be typically long lasting. The home user would like her other, (sporadically run) interactive or on-line streaming applications not effected by the presence of long-run bulk data transfers. The user aim would be differentiation of bulk data transfers such that they achieve appreciable throughput while not hurting other traffic.

Thus, needed are processes and a system that addresses the shortcomings of the prior art.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

In consideration of the above-identified shortcomings of the art, competitive and considerate congestion control is provided. For several embodiments, a method for end-to-end computer network congestion control on a network link comprises providing a specific average traffic rate guarantee to a network traffic connection of a particular priority whenever a bottleneck link can accommodate such a rate guarantee.

Also, a lower priority network traffic connection than that of the network traffic connection of a particular priority is enables to use residual bottleneck capacity. The network traffic of the lower priority connection is suppressed if a number of connections of the particular priority on the link is larger than can be accommodated by the link, for the specific average bandwidth guarantee.

A network traffic congestion control system is done as either (i) application-level service that paces the packet sending over time or (ii) comprises a congestion control module (CCM) client configured to send events to a CCM provider and means for interpreting the events to update TCP/IP congestion control state variables. Also included are means for continuing operation of a TCP/IP state machine with the updated state variables.

Other advantages and features of the invention are described below.

BRIEF DESCRIPTION OF THE DRAWINGS

Competitive and considerate congestion control is further described with reference to the accompanying drawings in which.

DETAILED DESCRIPTION

Certain specific details are set forth in the following description and figures to provide a thorough understanding of various embodiments of the invention. Certain well-known details often associated with computing and software technology are not set forth in the following disclosure to avoid unnecessarily obscuring the various embodiments of the invention. Further, those of ordinary skill in the relevant art will understand that they can practice other embodiments of the invention without one or more of the details described below. Finally, while various methods are described with reference to steps and sequences in the following disclosure, the description as such is for providing a clear implementation of embodiments of the invention, and the steps and sequences of steps should not be taken as required to practice this invention.

Example Computing Environments

Figure 1:
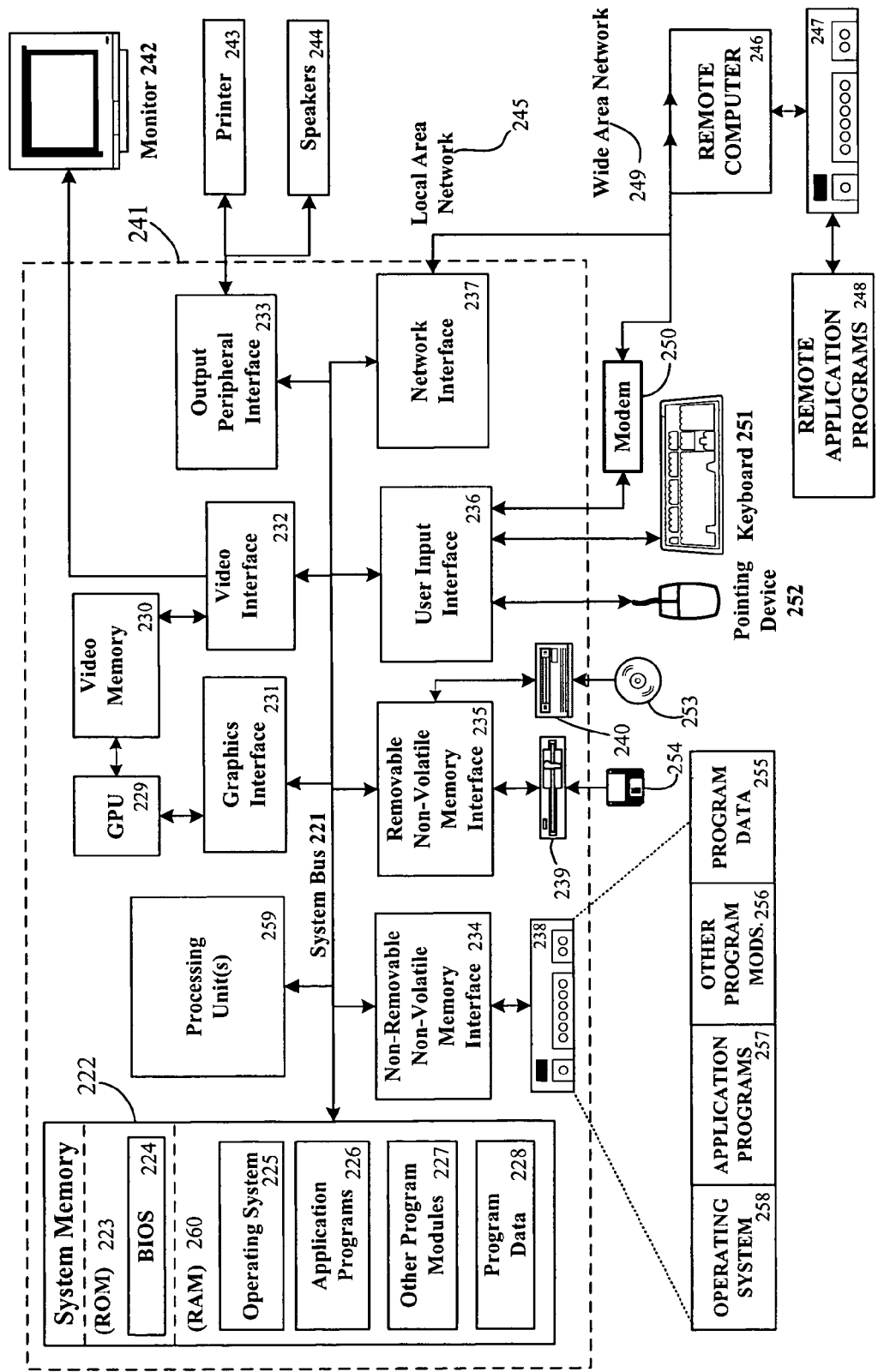
FIG. 1 is a block diagram representing an exemplary computing device suitable for use in conjunction with competitive and considerate congestion control (4CP)

Referring to FIG. 1, shown is a block diagram representing an exemplary computing device suitable for use in conjunction with implementing the processes described above. For example, the computer executable instructions that carry out the processes and methods for 4CP may reside and/or be executed in such a computing environment as shown in FIG. 1. The computing system environment 220 is only one example of a suitable computing environment and is not intended to suggest any limitation as to the scope of use or functionality of the invention. Neither should the computing environment 220 be interpreted as having any dependency or requirement relating to any one or combination of components illustrated in the exemplary operating environment 220. For example a computer game console may also include those items such as those described below for use in conjunction with implementing the processes described above.

Aspects of the invention are operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

Aspects of the invention may be implemented in the general context of computer-executable instructions, such as program modules, being executed by a computer. Generally, program modules include routines, programs, objects, components, data structures, etc. that perform particular tasks or implement particular abstract data types. Aspects of the invention may also be practiced in distributed computing environments where tasks are performed by remote processing devices that are linked through a communications network. In a distributed computing environment, program modules may be located in both local and remote computer storage media including memory storage devices.

An exemplary system for implementing aspects of the invention includes a general purpose computing device in the form of a computer 241. Components of computer 241 may include, but are not limited to, a processing unit 259, a system memory 222, and a system bus 221 that couples various system components including the system memory to the processing unit 259. The system bus 221 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 241 typically includes a variety of computer readable media. Computer readable media can be any available media that can be accessed by computer 241 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 241. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 222 includes computer storage media in the form of volatile and/or nonvolatile memory such as read only memory (ROM) 223 and random access memory (RAM) 260. A basic input/output system 224 (BIOS), containing the basic routines that help to transfer information between elements within computer 241, such as during start-up, is typically stored in ROM 223. RAM 260 typically contains data and/or program modules that are immediately accessible to and/or presently being operated on by processing unit 259. By way of example, and not limitation, FIG. 1 illustrates operating system 225, application programs 226, other program modules 227, and program data 228.

The computer 241 may also include other removable/non-removable, volatile/nonvolatile computer storage media. By way of example only, FIG. 1 illustrates a hard disk drive 238 that reads from or writes to non-removable, nonvolatile magnetic media, a magnetic disk drive 239 that reads from or writes to a removable, nonvolatile magnetic disk 254, and an optical disk drive 240 that reads from or writes to a removable, nonvolatile optical disk 253 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 238 is typically connected to the system bus 221 through an non-removable memory interface such as interface 234, and magnetic disk drive 239 and optical disk drive 240 are typically connected to the system bus 221 by a removable memory interface, such as interface 235.

The drives and their associated computer storage media discussed above and illustrated in FIG. 1, provide storage of computer readable instructions, data structures, program modules and other data for the computer 241. In FIG. 1, for example, hard disk drive 238 is illustrated as storing operating system 258, application programs 257, other program modules 256, and program data 255. Note that these components can either be the same as or different from operating system 225, application programs 226, other program modules 227, and program data 228. Operating system 258, application programs 257, other program modules 256, and program data 255 are given different numbers here to illustrate that, at a minimum, they are different copies. A user may enter commands and information into the computer 241 through input devices such as a keyboard 251 and pointing device 252, commonly referred to as a mouse, trackball or touch pad. Other input devices (not shown) may include a microphone, joystick, game pad, satellite dish, scanner, or the like. These and other input devices are often connected to the processing unit 259 through a user input interface 236 that is coupled to the system bus, but may be connected by other interface and bus structures, such as a parallel port, game port or a universal serial bus (USB). A monitor 242 or other type of display device is also connected to the system bus 221 via an interface, such as a video interface 232. In addition to the monitor, computers may also include other peripheral output devices such as speakers 244 and printer 243, which may be connected through a output peripheral interface 233.

The computer 241 may operate in a networked environment using logical connections to one or more remote computers, such as a remote computer 246. The remote computer 246 may be a personal computer, a server, a router, a network PC, a peer device or other common network node, and typically includes many or all of the elements described above relative to the computer 241, although only a memory storage device 247 has been illustrated in FIG. 1. The logical connections depicted in FIG. 1 include a local area network (LAN) 245 and a wide area network (WAN) 249, but may also include other networks. Such networking environments are commonplace in offices, enterprise-wide computer networks, intranets and the Internet.

When used in a LAN networking environment, the computer 241 is connected to the LAN 245 through a network interface or adapter 237. When used in a WAN networking environment, the computer 241 typically includes a modem 250 or other means for establishing communications over the WAN 249, such as the Internet. The modem 250, which may be internal or external, may be connected to the system bus 221 via the user input interface 236, or other appropriate mechanism. In a networked environment, program modules depicted relative to the computer 241, or portions thereof, may be stored in the remote memory storage device. By way of example, and not limitation, FIG. 1 illustrates remote application programs 248 as residing on memory device 247. It will be appreciated that the network connections shown are exemplary and other means of establishing a communications link between the computers may be used.

It should be understood that the various techniques described herein may be implemented in connection with hardware or software or, where appropriate, with a combination of both. Thus, the methods and apparatus of the invention, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the invention. In the case of program code execution on programmable computers, the computing device generally includes a processor, a storage medium readable by the processor (including volatile and non-volatile memory and/or storage elements), at least one input device, and at least one output device. One or more programs that may implement or utilize the processes described in connection with the invention, e.g., through the use of an API, reusable controls, or the like. Such programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

Although exemplary embodiments may refer to utilizing aspects of the invention in the context of one or more standalone computer systems, the invention is not so limited, but rather may be implemented in connection with any computing environment, such as a network or distributed computing environment. Still further, aspects of the invention may be implemented in or across a plurality of processing chips or devices, and storage may similarly be effected across a plurality of devices. Such devices might include personal computers, network servers, handheld devices, supercomputers, or computers integrated into other systems such as automobiles and airplanes.

In light of the diverse computing environments that may be built according to the general framework provided in FIG. 1, the systems and methods provided herein cannot be construed as limited in any way to a particular computing architecture. Instead, the invention should not be limited to any single embodiment, but rather should be construed in breadth and scope in accordance with the appended claims.

Figure 2:
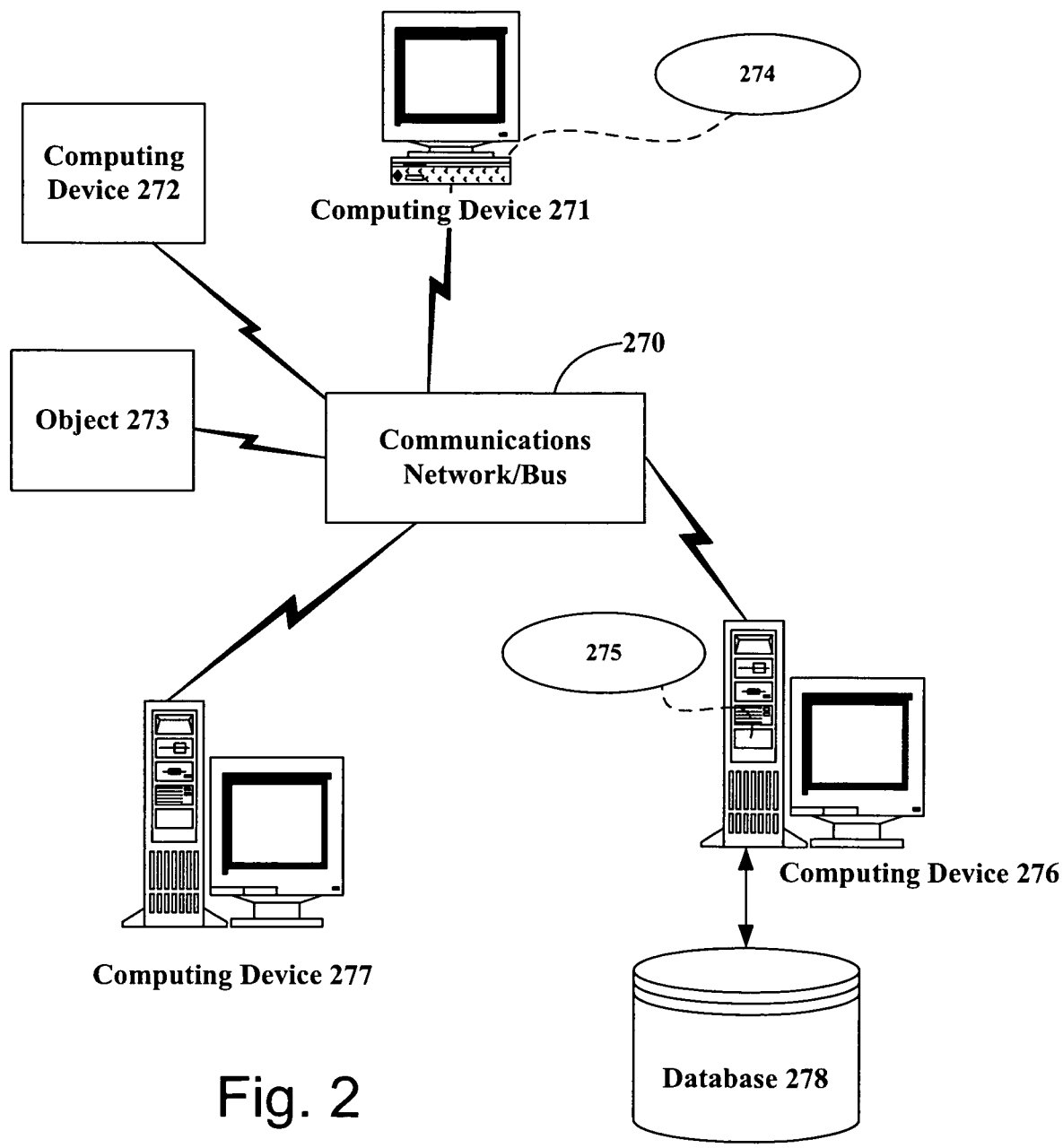
FIG. 2 illustrates an exemplary networked computing environment in which many computerized processes may be implemented to perform competitive and considerate congestion control.

Referring next to FIG. 2, shown is an exemplary networked computing environment in which many computerized processes may be implemented to perform the processes described above. For example, parallel computing may be part of such a networked environment with various clients on the network of FIG. 2 using and/or implementing 4CP. One of ordinary skill in the art can appreciate that networks can connect any computer or other client or server device, or in a distributed computing environment. In this regard, any computer system or environment having any number of processing, memory, or storage units, and any number of applications and processes occurring simultaneously is considered suitable for use in connection with the systems and methods provided.

Distributed computing provides sharing of computer resources and services by exchange between computing devices and systems. These resources and services include the exchange of information, cache storage and disk storage for files. Distributed computing takes advantage of network connectivity, allowing clients to leverage their collective power to benefit the entire enterprise. In this regard, a variety of devices may have applications, objects or resources that may implicate the processes described herein.

FIG. 2 provides a schematic diagram of an exemplary networked or distributed computing environment. The environment comprises computing devices 271, 272, 276, and 277 as well as objects 273, 274, and 275, and database 278. Each of these entities 271, 272, 273, 274, 275, 276, 277 and 278 may comprise or make use of programs, methods, data stores, programmable logic, etc. The entities 271, 272, 273, 274, 275, 276, 277 and 278 may span portions of the same or different devices such as PDAs, audio/video devices, MP3 players, personal computers, etc. Each entity 271, 272, 273, 274, 275, 276, 277 and 278 can communicate with another entity 271, 272, 273, 274, 275, 276, 277 and 278 by way of the communications network 270. In this regard, any entity may be responsible for the maintenance and updating of a database 278 or other storage element.

This network 270 may itself comprise other computing entities that provide services to the system of FIG. 2, and may itself represent multiple interconnected networks. In accordance with an aspect of the invention, each entity 271, 272, 273, 274, 275, 276, 277 and 278 may contain discrete functional program modules that might make use of an API, or other object, software, firmware and/or hardware, to request services of one or more of the other entities 271, 272, 273, 274, 275, 276, 277 and 278.

It can also be appreciated that an object, such as 275, may be hosted on another computing device 276. Thus, although the physical environment depicted may show the connected devices as computers, such illustration is merely exemplary and the physical environment may alternatively be depicted or described comprising various digital devices such as PDAs, televisions, MP3 players, etc., software objects such as interfaces, COM objects and the like.

There are a variety of systems, components, and network configurations that support distributed computing environments. For example, computing systems may be connected together by wired or wireless systems, by local networks or widely distributed networks. Currently, many networks are coupled to the Internet, which provides an infrastructure for widely distributed computing and encompasses many different networks. Any such infrastructures, whether coupled to the Internet or not, may be used in conjunction with the systems and methods provided.

A network infrastructure may enable a host of network topologies such as client/server, peer-to-peer, or hybrid architectures. The "client" is a member of a class or group that uses the services of another class or group to which it is not related. In computing, a client is a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer, e.g., a server. In the example of FIG. 2, any entity 271, 272, 273, 274, 275, 276, 277 and 278 can be considered a client, a server, or both, depending on the circumstances.

A server is typically, though not necessarily, a remote computer system accessible over a remote or local network, such as the Internet. The client process may be active in a first computer system, and the server process may be active in a second computer system, communicating with one another over a communications medium, thus providing distributed functionality and allowing multiple clients to take advantage of the information-gathering capabilities of the server. Any software objects may be distributed across multiple computing devices or objects.

Client(s) and server(s) communicate with one another utilizing the functionality provided by protocol layer(s). For example, HyperText Transfer Protocol (HTTP) is a common protocol that is used in conjunction with the World Wide Web (WWW), or "the Web." Typically, a computer network address such as an Internet Protocol (IP) address or other reference such as a Universal Resource Locator (URL) can be used to identify the server or client computers to each other. The network address can be referred to as a URL address. Communication can be provided over a communications medium, e.g., client(s) and server(s) may be coupled to one another via TCP/IP connection(s) for high-capacity communication.

In light of the diverse computing environments that may be built according to the general framework provided in FIG. 2 and the further diversification that can occur in computing in a network environment such as that of FIG. 2, the systems and methods provided herein cannot be construed as limited in any way to a particular computing architecture or operating system. Instead, the invention should not be limited to any single embodiment, but rather should be construed in breadth and scope in accordance with the appended claims.

Competitive and Considerate Congestion Control (4CP) Design

A congestion control protocol (an end-to-end congestion control) is described herein that emulates a different reference system than commonly presumed by "strict low priority" protocols. This end-to-end congestion control protocol is referred to herein as 4CP (Four 'C' protocol) to signify "Competitive and Considerate Congestion Control." 4CP provides a specific average rate guarantee to a normal priority connection whenever the bottleneck link can accommodate this. Furthermore, in this case the low priority connection uses the residual bottleneck capacity. If the number of the normal priority connections on the link is larger than can be accommodated by the link, for the specified average bandwidth guarantee, the outcome is to suppress low priority traffic. Note that the strict low priority is a special case of the reference model. In this case, the bandwidth guarantee is set equal to the link capacity, thus starving low priority traffic in presence of any normal priority traffic.

Figure 3:
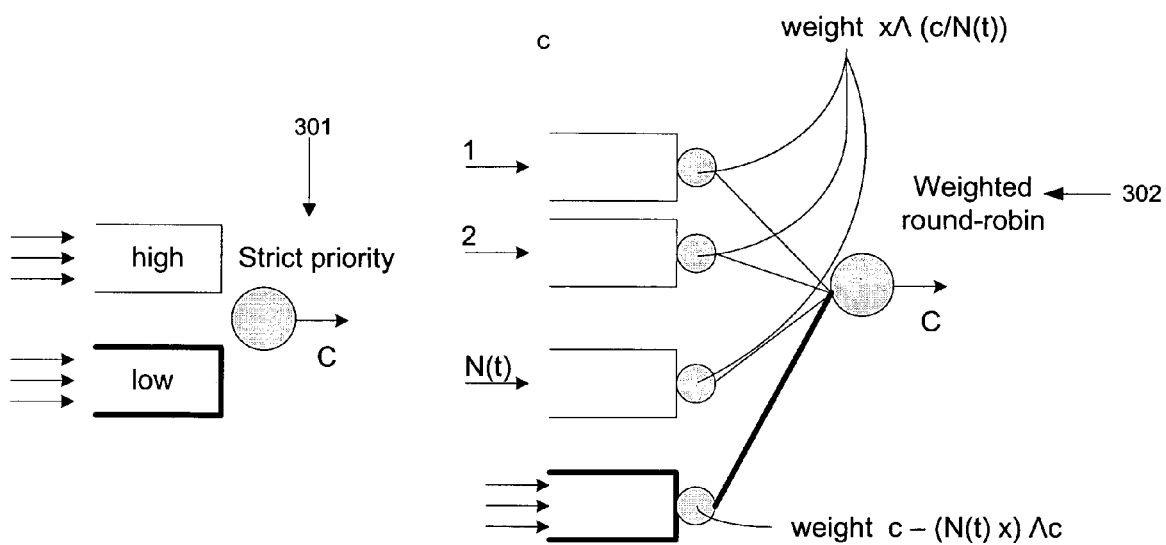
FIG. 3 illustrates 4CP bandwidth sharing model as a weighted-round robin scheduler that assigns a link of capacity c.

Referring next to FIG. 3, shown is 4CP reference system as a weighted-round robin scheduler that assigns a link of capacity c. Shown are the reference service differentiation systems:

"strict low priority" 301 and 4CP objective 302. x is a specified per-connection bandwidth guarantee for normal traffic. Whenever the number of normal priority connections (TCP) is smaller or equal to c/x, each is guaranteed the rate x and the low-priority consumes the residual bandwidth. Otherwise, if the number of TCP connections is larger than c/x, they share the link exclusively as they usually do.

4CP supports fixed or automatically tuned modes for setting the per-connection average bandwidth guarantee for normal priority (TCP). In the fixed mode, the bandwidth guarantee is a configuration parameter set by either user or policy. In the automatic mode, 4CP achieves TCP-fairness over a large timescale.

4CP is a window based congestion control that emulates the reference system described herein. It is implemented by a sender-only modification of standard TCP (New Reno), for example (however, other scenarios are possible with implementation by modification of other protocols as well). It requires no special network feedback. The controller design combines congestion control with detection whether network congestion is high or low. Provided herein are guidelines on setting the control parameters. These include configuring the detector so that false positives are low. Below, described are design goals of 4CP for two of its modes: fixed target window and automatic mode. Provided first is a description for a single-bottleneck with long-run connections having some common mean round-trip timer, which simplifies exposition of basic principles. Under this homogeneity assumption, one can either consider time average rate x of a long-run connection that runs a window based controller or average window $\bar{w}$, by appealing to the mean-value formula:

$$\bar{x} = \bar{w}/r$$

Later, the round-trip time heterogeneity is accounted for. The goal is to emulate the weighted round-robin reference system in FIG. 3, for some given reference rate x. The objective of the reference system is further explained in FIG. 4.

Figure 4:
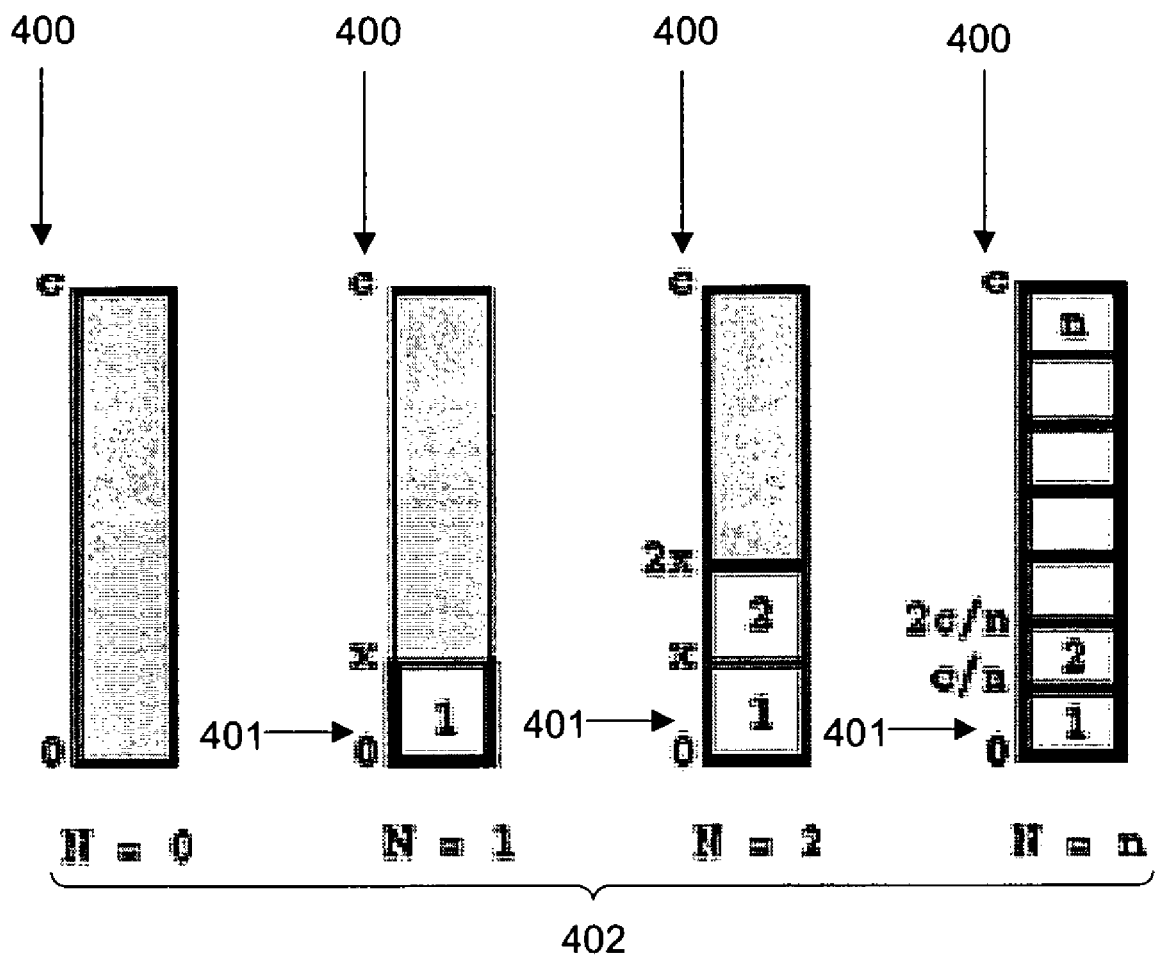
FIG. 4 illustrates the 4CP bandwidth sharing model of FIG. 3.

FIG. 4 illustrates the bandwidth partitioning objective the 4CP reference system of FIG. 3. link of capacity c 400 is shared by normal priority and low priority connections. Each normal priority is given a chunk of bandwidth x 401, whenever their number N 402 is sufficiently small so that N 402 chunks of bandwidth x 401 can be "packed" into [0, c]. The low priority connections are assigned the residual capacity c−Nx. Otherwise, when Nx≧c, a normal priority connection is assigned the fair share c/N and low priority connections are assigned no bandwidth.

The choice of reference rate x is assumed to be either by a user or by a policy. The latter is preferred in public environments as letting a user tune this configuration parameter would provide easy means to throttle down downstream traffic by setting the parameter to a small value.

In order to fit better with notation in the rest of the paper, the design goal is phrased in terms of the target window tarw, related to the reference rate x, by x=tarw/r. The reference system assigns rate tarw/r to any normal priority connection, whenever the number of normal priority connections, n, satisfies n(tarw/r)<c, else, it assigns the fairshare rate c/n. The goal is thus to assign the average window.

$$w_l(n) = \frac{1}{m}\max\{cr - n \cdot tarw, 0\}$$

to any low priority connection, whenever there are m of them and there are n normal priority connections. The respective average window for a normal priority connection is:

$$w_h(n) = \min\left\{tarw, \frac{cr}{n}\right\}.$$

Suppose normal priority connections are adaptive and obey a relation between the average window $\bar{w}$ and loss event rate p, for some positive-valued, decreasing function $f(p)$ on [0, 1]:

$$\bar{w} = f(p)$$

For TCP, such relation is well studied. Examples are:

SQRT formula $f(p)=\sqrt{3/2/b}\sqrt{P}$     (i)

a simplified version of PFTK formula $f(p)=1/(\sqrt{2b/3}$
$\sqrt{P}+q3/2\sqrt{3b/2}\sqrt{p^3}+32\sqrt{p^7})$,     (ii)

where b is the number of packets acknowledged by an acknowledgment (e.g. 2) and q is the ratio of the retransmit timeout value and mean round-trip time. Enforcing the congestion window tarw to normal priority connections can be seen as enforcing a reference loss event rate tarp. In the prevailing setting, one can interchangeably consider the target window tarw or loss event rate tarp, the two are related by tarw=f(tarp). Denoting with p the instantaneous loss event rate observed by a low priority connection, it follows from the above identities that the following holds:

p=tarp and $w_l$≧0 p>tarp and $w_l$=0.     (1)

The reference loss event rate tarp discriminates network congestion state as either "good" (p=tarp) or "bad" (p>tarp). Note that a low priority connection has a positive window only in good states, and thus the average loss event rate observed by a low priority connection is tarp. The same design objectives are admitted as for the fixed target window mode, but instead of arbitrarily fixing the target loss event rate tarp, impose additional constraint:

$$tarw = \bar{w}$$     (2)

where $\bar{w}$ is the long-run average window of a low priority connection. The rationale is to make a low priority connection TCP friendly in the long-run. Specifically, the definition of a conservative control is admitted, that says a source of bits is conservative if its throughput $\bar{x}$, and loss event rate $\bar{p}$ verify:

$$\bar{x} \leq g(\bar{p})$$

for a given loss-throughput function g. In view of (2) and noting from (1) that $$\bar{p}=tarp$$

the goal is to design a conservative controller that achieves the conservativeness condition:

$$\bar{x} \leq (1/r)f(\bar{p})$$

with equality.

The underlying bandwidth sharing objective of 4CP Automatic is optimal for a microeconomics problem that combines both short-run and long-run users, where the latter are assumed to optimize their long-run achieved throughputs.

Scenario 1: 4CP Window-Based Controller—Sender-Only

4CP is a window based controller. Its unique control features are part of congestion avoidance mode. Other modes, such as slow-start, fast recovery, flow control, remain the same as for standard TCP. Next, the congestion avoidance part of the protocol is described. The control state comprises: (virtual) window wnd and congestion window cwnd. The parameters use to update the control state are: target loss rate tarp, minimum congestion window mincwnd, maximum congestion window maxcwnd, and minimum wnd value −wndbnd. The state (wnd, cwnd) is updated as follows. Whenever the controller switches to congestion avoidance, cwnd=wnd.

In congestion avoidance, (wnd, cwnd) are updated upon following events:

If ack:

$$wnd \leftarrow \min(wnd+1/cwnd, maxcwnd)$$     (3)

If triple-dupack:

$$wnd \leftarrow \max(wnd-1/(tarp \cdot wnd), -wndbnd)$$     (4)

In either case:

$$cwnd \leftarrow \max(wnd, mincwnd)$$     (5)

Consider the control by ignoring the reflections at the boundaries mincwnd and maxcwnd and assume cwnd≧0, i.e. consider cwnd 7 cwnd+1/cwnd per received acknowledgment and cwnd<−cwnd−1/(tarp·cwnd) per triple-duplicate acknowledgment. The former amounts to incrementing the congestion window for 1 segment per round-trip round in absence of congestion indication, presuming no delayed acknowledgements (or ½ segment, if acknowledgements are delayed). Suppose the latter occurs with rate cwndp, for some instantaneous loss event rate p. Then, the drift of the congestion window is 1−p/tarp. Hence, either p=tarp and congestion window takes some positive value or p>tarp and cwnd=mincwnd as the drift is strictly negative. wnd, congestion window and detector: The wnd has a dual role. First, if wnd≧mincwnd, wnd=cwnd, wnd is in fact used as congestion window. Second, wnd<mincwnd, wnd has a role of a detector of bad phase. In the latter case, cwnd=mincwnd, and thus in the wnd updates, one can replace tarp wnd with tarp·mincwnd. The detector indicates phase is bad whenever wnd<0. Increments of wnd and cwnd are additive increase over roundtrip rounds, same as with standard TCP. The decrement is specific to 4CP.

Figure 5:
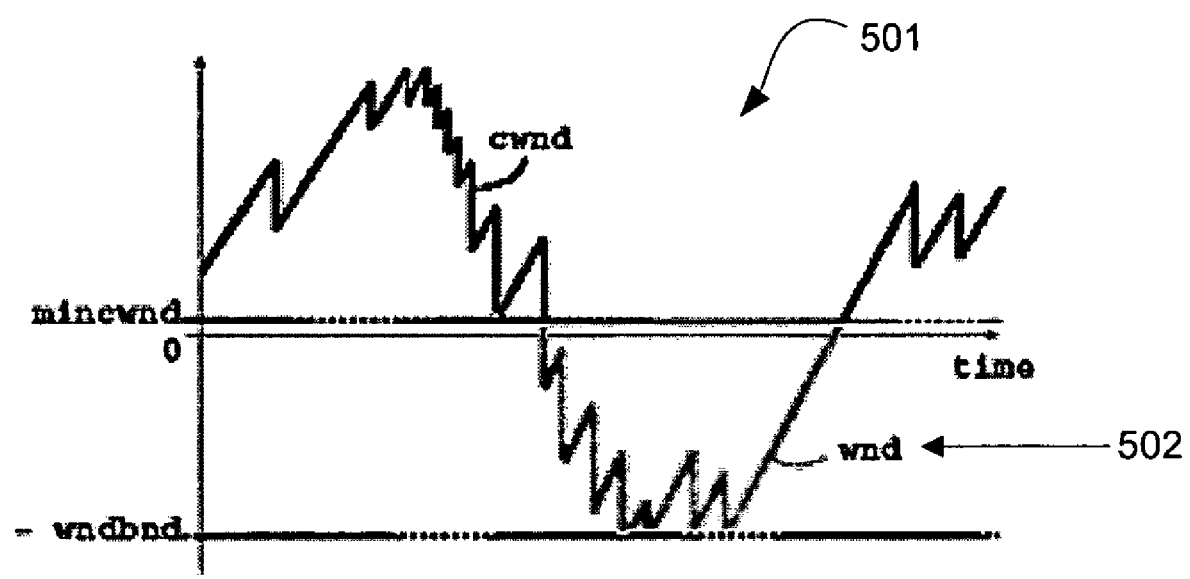
FIG. 5 is a chart illustrating 4CP window control elements.

Referring next to FIG. 5, shown is a chart illustrating 4CP window control elements. Shown are 4CP window control elements: additive-increase (as TCP) and inverse-decrease (4CP specific) 501, and window wnd extended to negative values 502. Whenever wnd≧mincwnd, cwnd=wnd and thus wnd is used as congestion window in a standard way. In the other case, wnd<mincwnd, wnd turns out to be a detector of bad phase and throughout bad phase congestion window cwnd is fixed to minimum congestion window mincwnd.

4CP Automatic mode adapts the reference loss-event rate tarp per each received acknowledgment as:

$$tarp \leftarrow tarp + a(f(tarp) - cwnd)/cwnd \quad (6)$$

where a is a gain parameter; a small constant after a sufficient number of iterates, and otherwise specified below with respect to the gain of target loss rate adaptation. Taking a small constant a<<1, by timeaveraging argument, (6) aims to the balance:

$$\overline{w} = f(tarp)$$

where w is average window sampled over round-trip time rounds. This is precisely the condition (2). Also, 4CP implements no special functionalities at a receiver, and thus can use any standard TCP receiver socket. Ideally, when congestion state is in bad phase, 4CP should not be sending data at all, and thus mincwnd should be set to 0. But this in practice is infeasible as the controller needs to continue sensing the congestion state and thus must send some little probe data for inference, and for this reason mincwnd is set to a positive value. Now, the smaller the mincwnd, the smaller the send rate in a bad phase. In the 4CP implementation by adaptation of a TCP sender, mincwnd is set to 2 segments in order to prevent timeouts due to Nagle's algorithm. This could be further refined to achieve lower send rates in bad phase than 2 segments per round-trip time round. There are two conflicting goals to set wndbnd to either a small or a large positive value. The former setting is desirable in order to have a quick detector that will take a small number of round-trip time rounds to switch from indicating phase is bad to phase is good, presuming such a transition did happen. The latter, though, is desirable to have small false positives, i.e. the detector indicates incorrectly a transition from bad to good phase. The problem can be seen as a sequential hypothesis testing problem, known as change point detection, which deals with the trade-off between quick and reliable detection. In the present definition of the bad phase detector wnd (3)-(4), a lower bound-wndbnd is imposed. One needs to impose such a bound because in its absence, if for a long time the phase happened to be bad, wnd will tend to excessively negative values as its drift is strictly negative. In a hypothetical case, wnd will converge to −.infin.. For this reason, one needs a finite lower bound on wnd. The fraction of time of false positives decreases exponentially with the boundary parameter wndbnd. The result of Theorem 1 below suggests setting the configuration parameter wndbnd as displayed in (9). The detector does a sequential hypothesis test with null hypothesis: phase is bad, i.e. loss rate>tarp. The goal is to estimate what fraction of time the detector indicates phase is good, under the null hypothesis. These are false positives. The number of loss events observed on a time interval (0, t] is denoted with N(0, t]. One imposes assumptions on the process of loss events to carry the analysis further. To that end, one assumes loss events appear at points of a Poisson process with intensity .lamda.(t)=cwnd(t)p, for a fixed loss rate p>tarp. Note that by the design, cwnd(t)=mincwnd, whenever w(t) .ltoreq.mincwnd. This motivates to consider the following dynamics of the window, wnd(0).gtoreq.−wndbnd and for t.gtoreq. 0 :

$$wnd(t) = \upsilon(0) \lor \sup a.ltoreq.t\{(t-s) - cN(s, t] - wndbnd\} \quad (7)$$

where v(0):=wnd(0)+t−cN(0, t], c:=1/(mincwnd·tarp) and loss events appear as points of a homogeneous Poisson process in time with rate mincwnd·p. The dynamics captures the linear increase of the window over round-trip rounds (in the absence of loss events). They also capture fixed decrements upon loss events whenever the window is less than equal to mincwnd.

Theorem 1 (False Positives). Suppose p/tarp=r>1, i.e. phase is bad. The long-run fraction of time the detector w(t) indicates false positives is:

$$f = e^{-\lambda \cdot a \cdot (mincwnd + wndbnd)}$$

where λ:=mincwnd·tarp·r and a is the solution of $$1 - a = e^{-ar}. \quad (8)$$

The result suggests to set the control parameter wndbnd as:

$$wndbnd = \frac{1}{mincwnd \cdot tarp} \frac{\log\left(\frac{1}{f}\right)}{ar} \quad (9)$$

for some fixed r>1, with the aim to bound the fraction of time of false positives to f, whenever the loss rate is larger than tarp for a fixed factor r. Note that the boundary wndbnd adapts over a large timescale through the adaptation of tarp. It is desirable to lower bound the value (9) to a sufficiently large value to ensure quick detection of the bad to good phase transition.

One wants to set the adaptation gain parameter a of the target loss rate tarp (6) to a small value so that tarp is virtually constant. On the other hand, the adaptation gain a should not be too small because then it would take a long time for tarp to converge to equilibrium. These are two conflicting goals. In the present design, the adaptation gain is chosen to be initially large and decreases with the number of the updates of tarp to a small value used for the rest of the transfer. In particular, used is a linearly decreasing function with the number of the iterations. The rationale is to set the initial tarp to the instantaneous loss rate by fast adaptive learning and then eventually let it run as prescribed by (6) with fixed adaptation gain.

Scenario 2: 4CP Window-Based Controller—Receiver-Only

Figure 10:
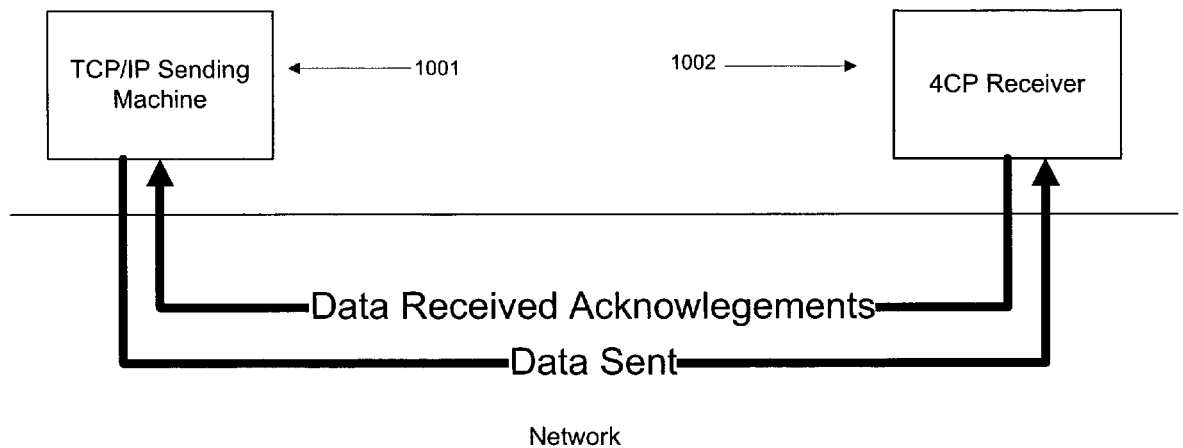
FIG. 10 is a block diagram illustrating an Internet level systems overview of the 4CP controller in operation for 4CP receiver side control logic with a TCP transport.

Referring to FIG. 10, described are only the distinctions with Scenario 1. The control variable at the receiver 1002 is vcwnd and cwnd is replaced with the TCP receiver window, rcvwnd. (This may be combined with TCP acknowledgement (ack) throttling in a way it is done for Background Transfer Protocol described in European Patent Application No. 05015419.4 "Control of Background Transfers" filed Jul. 15, 2005. The sender 1001 is a standard, unmodified TCP/IP sender.

Scenario 3: Rate-Based Controller—Lightweight Receiver

Figure 11:
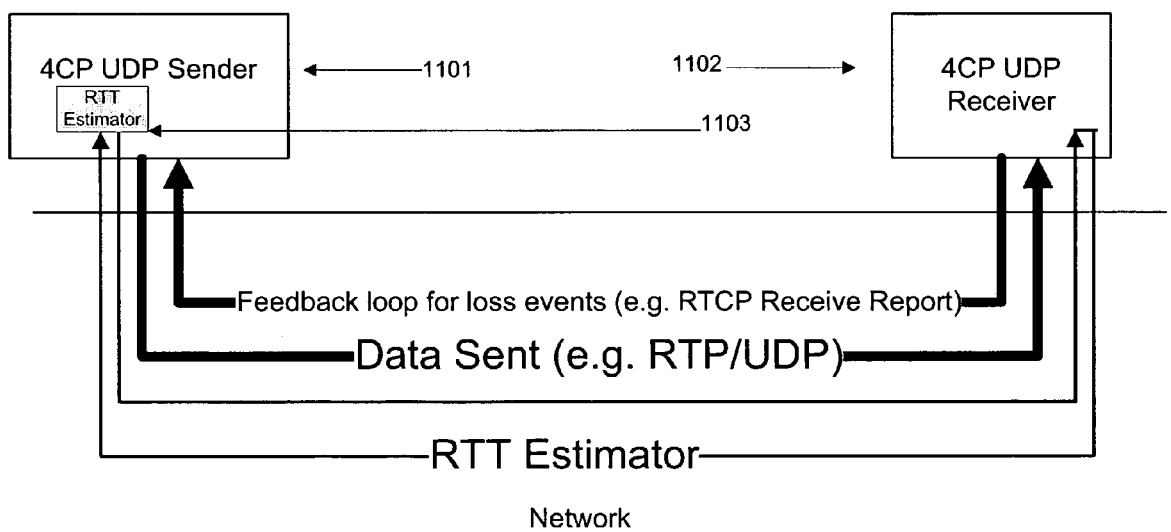
FIG. 11 is a block diagram illustrating an Internet level systems overview of the 4CP controller in operation for 4CP sender side control logic with a UDP transport.

Referring to FIG. 11, the sender 1101 and receiver 1102 are interconnected with a feedback loop, e.g. RTCP. The receiver 1102 sends feedback reports back to the sender 1101, periodically with some inter-report time or upon detection of a loss event. The packet headers contain packet sequence numbers. The sender 1101 maintains control variable X that limits the send rate in bits per second by setting the inter-spacing of transmitted packets to 1/X. The sender 1101 maintains the variables, tarp, and rtt, for the target loss rate and round-trip time estimate (using a round-trip time estimator 1103), respectively. The tarp is controlled as $$tarp <- tarp + a(f(tarp)/rtt - N) \quad (10)$$

where a is a positive constant and N is the number of bits transmitted between two successive updates of tarp, divided with the elapsed time.

The send rate is set as:

$$X = MSS \cdot w/rtt$$

where MSS is maximum packet length in bits and w is adjusted as:

per received report indicating no loss event:

$$w <- w + b$$

per received report indicating a loss event:

$$w <- \max(w - b/w/tarp, 0)$$

where b is a positive constant.

The receiver 1102 detects loss events and sends reports back to the sender 1101. The feedback reports indicate whether a loss event has happened over the last feedback inter-arrival time and contain the sequence number of the last received packet. The latter may be used for round-trip time sampling by the sender 1101.

Scenario 4: Rate-based Controller—Lightweight Sender

Figure 12:
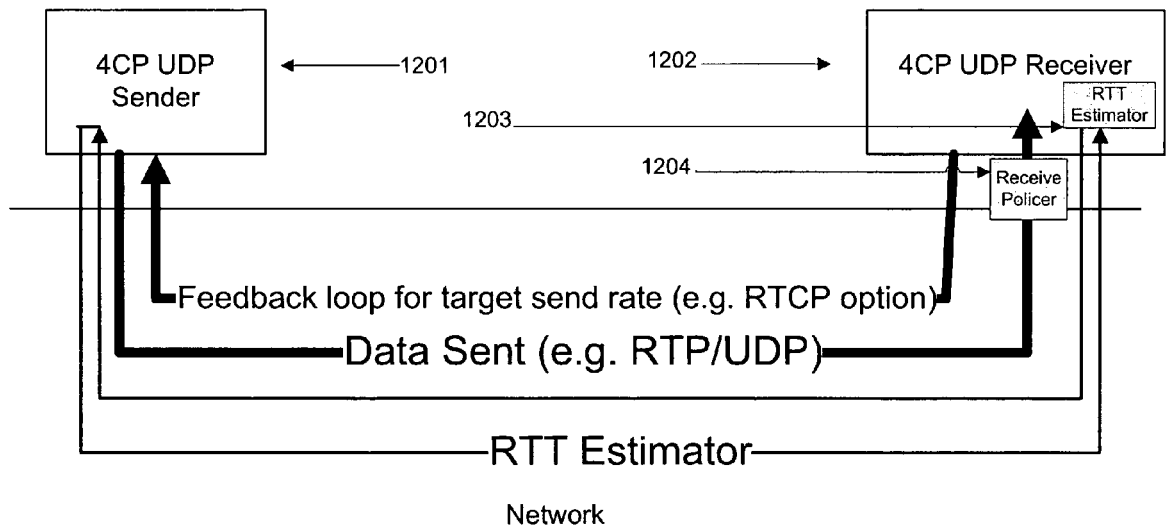
FIG. 12 is a block diagram illustrating an Internet level systems overview of the 4CP controller in operation for 4CP receiver side control logic with a UDP transport.

Referring to FIG. 12, it assumed that the sender 1201 is controlled in some way based on the explicit rate feedback by the receiver 1202, for example, by an intermediate shaper or policer 1204 at the receiver side with output rate equal to the explicit rate. The explicit rate, X, is computed at the receiver 1202 as follows. The receiver 1202 is provided with round-trip time samples in some way, e.g. by an outbound connection (using a round-trip time estimator 1203). The receiver 1202 adjusts the variable tarp as in Equation (10), where N is the number of received packets between two successive updates of tarp. The rest of the control parameters and variables are as per Scenario 3.

Example Implementations of 4CP in Microsoft Windows® Operating System

Figure 6:
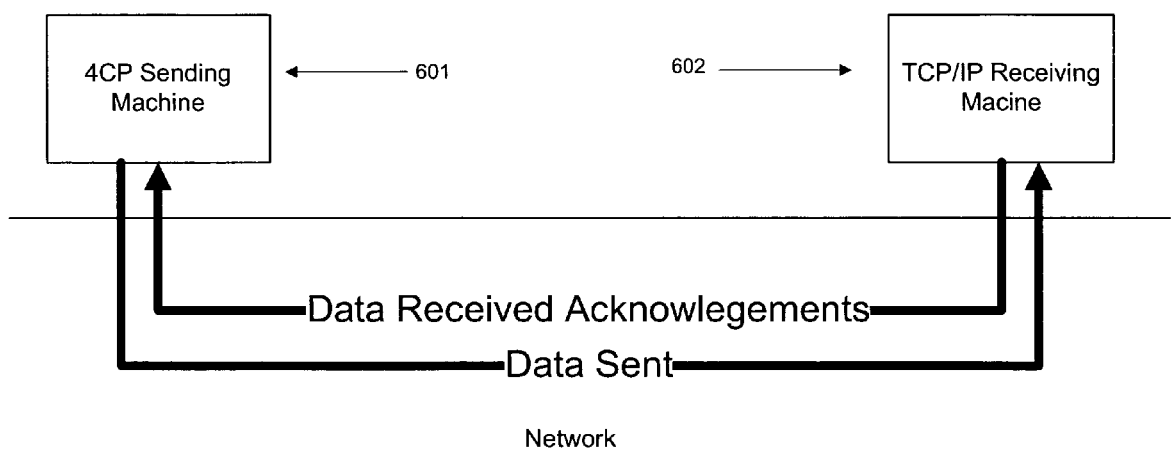
FIG. 6 is a block diagram illustrating an Internet level systems overview of the 4CP controller in operation for 4CP sender side control logic.

Referring next to FIG. 6, shown is a block diagram illustrating an Internet level systems overview of the 4CP controller in operation. Shown are the 4CP sending machine 601, the TCP/IP receiving machine 602. Data is sent from the 4CP sending machine 601 to the TCP/IP receiving machine 602. Then data received acknowledgements are sent back to the 4CP sending machine 601 from the TCP/IP receiving machine 602. A software module is added to the Microsoft Windows® TCP/IP stack 602 in kernel mode that implements the 4CP congestion controllers design goals. It does this at a high level by manipulating two standard TCP/IP state variables, the Slow Start Threshold and the Congestion Window.

Figure 7:
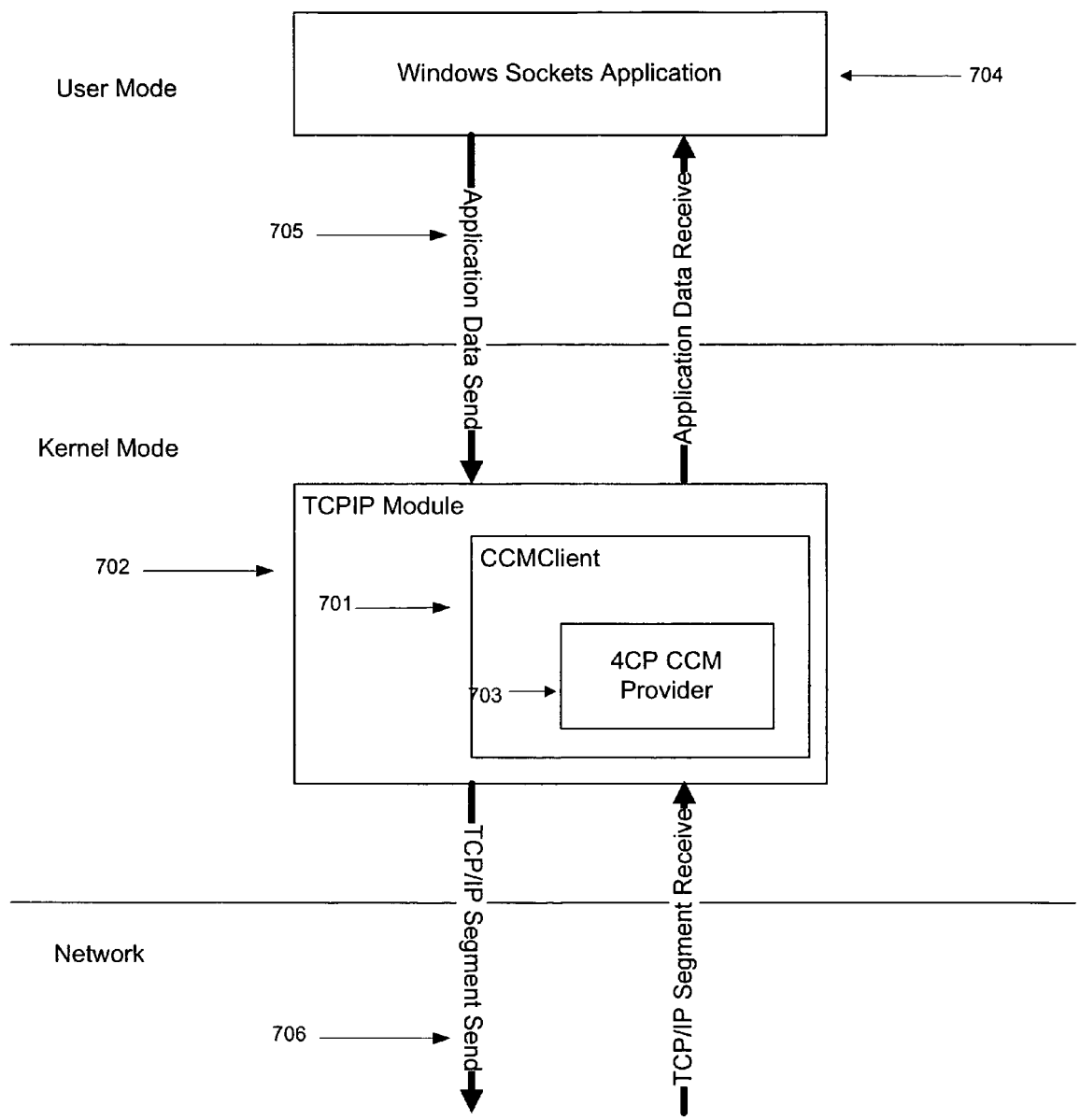
FIG. 7 is a block diagram illustrating an example of kernel mode implementation of the 4CP controller.

Referring next to FIG. 7, shown is a block diagram illustrating an example of kernel mode implementation of the 4CP controller. FIG. 7 shows the point at which 4CP is implemented. It is implemented as a component known as a Congestion Control Module (CCM) in the pre-release Microsoft Windows® Vista® operating system. In kernel mode, the CCMClient 701 resides within the TCP/IP Module 702. Within the CCMClient is the 4CP CCM provider 703. Application data is sent and received 705 between the Microsoft Windows® Sockets Application 704 in user mode and the TCP/IP Module 702. TCP/IP Segment information is sent and received 706 between the TCP/IP Module 702 and the network.

Figure 8:
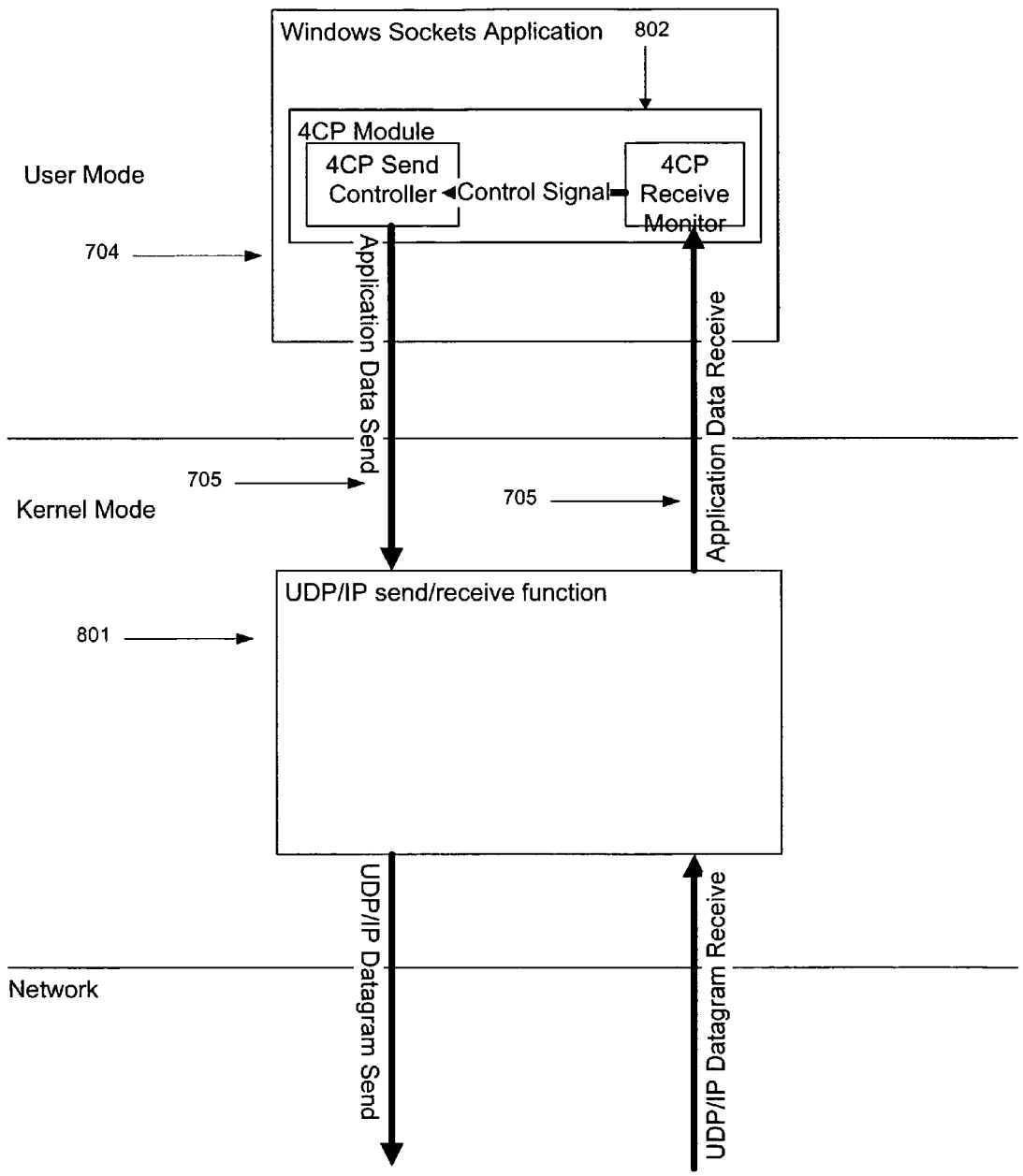
FIG. 8 is a block diagram illustrating an example of user mode implementation of the 4CP controller.

Referring next to FIG. 8, shown is a block diagram illustrating an example of user mode implementation of the 4CP controller. The same congestion controller described above is also implemented, for example, as a solely user-mode application under the Microsoft Windows® XP® operating system. This operates in both sender and receiver side modes but is not integrated with the TCP/IP stack. Shown are the UDP/IP send/receive function and the Microsoft Windows® Sockets Application 705. Within the Microsoft Windows® Sockets Application 705 is the 4CP Module 802. This was used as a proof of concept and evaluation test bed prior to moving to the kernel mode implementation.

Figure 9:
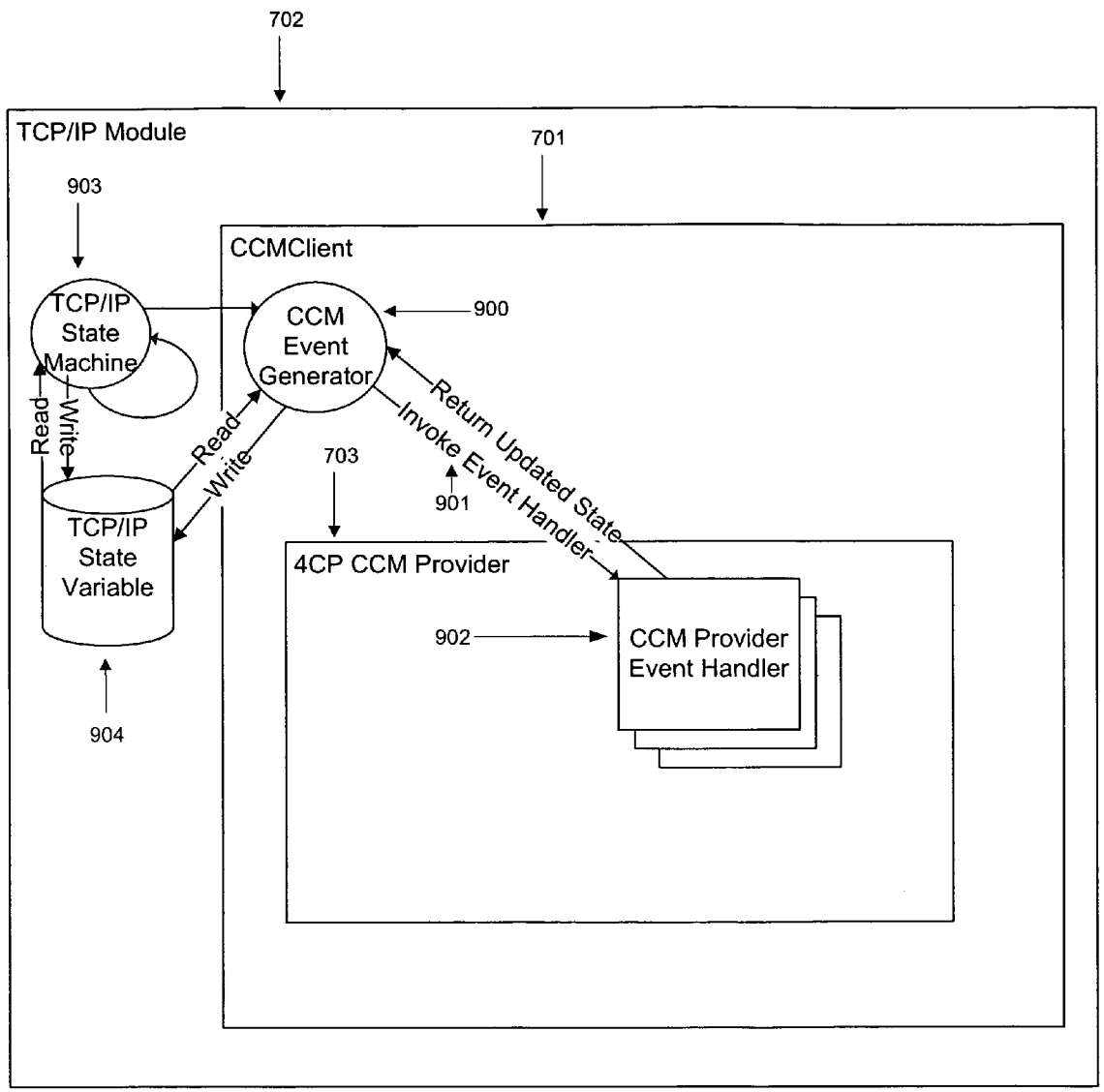
FIG. 9 a diagram illustrating an example implementation of the 4CP as a congestion control module (CCM).

Referring next to FIG. 9, shown is a diagram illustrating an example implementation of the 4CP as a congestion control module (CCM). The operation of the CCM is implemented in the Microsoft Windows.RTM. Vista.RTM. operating system kernel. At a basic level, the CCM client 701 sends events 901 with the CCM event generator 900 to the CCM provider (in this case 4CP) 703. 4CP 703 interprets these events to manipulate the TCP/IP state variables 904 Slow Start Threshold and Congestion Window which it updates before returning from the CCM event handler 902. The windows TCP/IP stack then continues with the operation of the TCP/IP state machine 903 with these updated state variables 904. This implements the 4CP controller as shown in FIG. 9.

A summary of the reaction to CCM events is shown below:

| | |
|---|---|
| TCP/IP Time-out Event | Log the timeout event in the 4CP context block. Update the 4CP Virtual Congestion Window (decrement), TCP/IP slow start threshold and TCP/IP congestion window. This results in decrementing the TCP/IP congestion window and slowstart threshold in a 4CP specific fashion. |
| TCP/IP Send Acknowledgement Event | Log the send (positive) acknowledgement in the 4CP context block. Subject to the number of duplicate acknowledgements received, update the 4CP Virtual Congestion Window (decrement), TCP/IP slow start threshold and TCP/IP congestion window. This may involve implementing a TCP/IP like slow start algorithm but generally increases the TCP/IP congestion window and updates the TCP/IP slow start threshold in a 4CP specific fashion. |
| TCP/IP Duplicate | Log the duplicate acknowledgement in the |

| | -continued |
|---|---|
| Acknowledgement Event | 4CP context block. Subject to the number of duplicate acknowledgements received, update the 4CP Virtual Congestion Window (decrement), TCP/IP slow start threshold and TCP/IP congestion window. Different updates based on a triple duplicate acknowledgement event and subsequent attempt to implement a TCP New Reno like fast recovery algorithm although this is different for 4CP. |
| TCP/IP Send Event | Log the send event in the 4CP context block |
| TCP/IP Rtt Sample Event | Log the RTT sample in the 4CP context block |

The various systems, methods, and techniques described herein may be implemented with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computer will generally include a processor, a storage medium readable by the processor (including volatile and non-volatile memory and/or storage elements), at least one input device, and at least one output device. One or more programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus of the present invention may also be embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, the machine becomes an apparatus for practicing the invention. When implemented on a general-purpose processor, the program code combines with the processor to provide a unique apparatus that operates to perform the indexing functionality of the present invention.

While the present invention has been described in connection with the preferred embodiments of the various figures, it is to be understood that other similar embodiments may be used or modifications and additions may be made to the described embodiment for performing the same function of the present invention without deviating there from. Furthermore, it should be emphasized that a variety of computer platforms, including handheld device operating systems and other application specific hardware/software interface systems, are herein contemplated, especially as the number of wireless networked devices continues to proliferate. Therefore, the present invention should not be limited to any single embodiment, but rather construed in breadth and scope in accordance with the appended claims.

Finally, the disclosed embodiments described herein may be adapted for use in other processor architectures, computer-based systems, or system virtualizations, and such embodiments are expressly anticipated by the disclosures made herein and, thus, the present invention should not be limited to specific embodiments described herein but instead construed most broadly.

What is claimed is:

1. A computer-implemented method for end-to-end computer network congestion control on a network link comprising:
   the computer providing a specific average traffic rate guarantee to each of one or more network traffic connections, configured in accordance with a first protocol and having a particular priority whenever a bottleneck link can accommodate such a rate guarantee;
   the computer enabling each of one or more network traffic connections, configured in accordance with a second protocol and having a second priority, the second priority lower than the first priority, to use residual bottleneck capacity;
   the computer monitoring a loss event rate of a network traffic connection having the second priority to determine if the loss event rate is greater than a target loss event rate; and
   if the loss event rate is greater than a target loss event rate, the computer suppressing the capacity of the network traffic connection of the second priority in a controlled manner in which an adaptation gain parameter of the target loss event rate is initially set to a relatively high value and linearly decreased upon subsequent updates of the target loss event rate, wherein the capacity of the network traffic connection of the second priority is reduced to a minimal amount sufficient to determine a congestion state of the network link.

2. The method of claim 1 wherein the capacity of the network traffic connection of the second priority is suppressed if a number of connections of the first priority on the link is larger than can be accommodated by the link, for the specific per-connection average bandwidth guarantee.

3. The method of claim 2 wherein the specific average traffic rate guarantee x is provided such that whenever the number of connections of the first priority on the link is smaller or equal to c/x, each connection of the first priority is guaranteed the rate x and the one or more network traffic connections having the second priority consumes the residual bandwidth, otherwise, if the number of connections of the first priority on the link is larger than c/x, the connections of the first priority on the link share the link exclusively, wherein c is the capacity of the link.

4. The method of claim 3 wherein the second protocol is either a sender-only adaptation or receiver-only adaptation of the first protocol.

5. A computer readable storage medium having instructions thereon for performing the steps of claim 4.

6. A computer readable storage medium having instructions thereon for performing the steps of claim 2.

7. A computer readable storage medium having instructions thereon for performing the steps of claim 3.

8. A computer readable storage medium having instructions thereon for performing the steps of claim 1.

9. A system for end-to-end computer network congestion control on a network link comprising:
   a memory storing executable instructions; and
   a processor, coupled to the memory, for executing the instructions to:
   provide a specific average traffic rate guarantee to each of one or more network traffic connections, configured in accordance with a first protocol and having a particular priority whenever a bottleneck link can accommodate such a rate guarantee;

enable each of one or more network traffic connections, configured in accordance with a second protocol and having a second priority, the second priority lower than the first priority, to use residual bottleneck capacity;

monitor a loss event rate of network traffic connection having the second priority to determine if the loss event rate is greater than a target loss event rate; and if the loss event rate is greater than a target loss event rate, suppress the capacity of the network traffic connection of the second priority in a controlled manner in which an adaptation gain parameter of the target loss event rate is initially set to a relatively high value and linearly decreased upon subsequent updates of the target loss event rate, wherein the capacity of the network traffic connection of the second priority is reduced to a minimal amount sufficient to determine a congestion state of the network link.

10. The system of claim 9 wherein the executable instructions further:

suppress the capacity of the network traffic connection of the second priority connection if a number of connections of the first priority on the link is larger than can be accommodated by the link, for the specific average bandwidth guarantee.

11. The system of claim 10 wherein the specific average traffic rate guarantee x is provided such that whenever the number of connections of the first priority on the link is smaller or equal to c/x, each connection of the first priority is guaranteed the rate x and the one or more network traffic connections having the second priority consumes the residual bandwidth, otherwise, if the number of connections of the first priority on the link is larger than c/x, the connections of the first priority on the link share the link exclusively, wherein c is the capacity of the link.

12. The system of claim 11 wherein the second protocol is either a sender-only adaptation or receiver-only adaptation of the first protocol.

* * * * *